(12) United States Patent
Johnson

(10) Patent No.: US 11,836,568 B2
(45) Date of Patent: Dec. 5, 2023

(54) CONTACTLESS CONDIMENT DISPENSER

(71) Applicant: Sam Johnson, Largo, FL (US)

(72) Inventor: Sam Johnson, Largo, FL (US)

( * ) Notice: Subject to any disclaimer, the term of this patent is extended or adjusted under 35 U.S.C. 154(b) by 354 days.

(21) Appl. No.: 17/341,044

(22) Filed: Jun. 7, 2021

(65) Prior Publication Data
US 2021/0383084 A1 Dec. 9, 2021

Related U.S. Application Data

(60) Provisional application No. 62/705,026, filed on Jun. 8, 2020.

(51) Int. Cl.
| | |
|---|---|
| *G06K 7/10* | (2006.01) |
| *G06K 19/04* | (2006.01) |
| *G06K 19/07* | (2006.01) |
| *A23P 20/12* | (2016.01) |
| *A23P 20/15* | (2016.01) |
| *A23L 27/10* | (2016.01) |
| *A23L 27/60* | (2016.01) |

(52) U.S. Cl.
CPC .......... *G06K 7/10415* (2013.01); *A23L 27/10* (2016.08); *A23L 27/60* (2016.08); *A23P 20/12* (2016.08); *A23P 20/15* (2016.08); *G06K 7/10237* (2013.01); *G06K 19/041* (2013.01); *G06K 19/0723* (2013.01); *A23V 2200/15* (2013.01)

(58) Field of Classification Search
CPC .......... A23L 27/10; A23L 27/60; A23P 20/12; A23P 20/15; A23V 2002/00; A23V 2200/15; G06K 19/041; G06K 19/0723; G06K 7/10237; G06K 7/10415
See application file for complete search history.

(56) References Cited

U.S. PATENT DOCUMENTS

| | | | | |
|---|---|---|---|---|
| 2015/0144653 | A1* | 5/2015 | Kline | G07F 9/001 222/23 |
| 2017/0280763 | A1* | 10/2017 | Nazarian | A23P 20/15 |
| 2019/0164237 | A1* | 5/2019 | Newman | G06Q 50/12 |
| 2021/0197226 | A1* | 7/2021 | Turner | B05C 17/00596 |

* cited by examiner

*Primary Examiner* — Omer S Khan
(74) *Attorney, Agent, or Firm* — Weide & Miller, Ltd.

(57) ABSTRACT

A contactless or touchless dispenser is provided, such as for condiments or similar food service related items. The dispenser allows a user to obtain a quantity of a condiment without being required to touch the condiment dispenser. The dispenser includes a controller for controlling a dispensing mechanism, such as in response to an instruction received from a remote device, or by touchless input, such as by detecting a utensil. The controller may control the dispensing mechanism to cause the dispenser to dispense condiment for a particular period of time or to dispense a particular quantity of condiment.

15 Claims, 2 Drawing Sheets

CONTACTLESS CONDIMENT DISPENSER

RELATED APPLICATION DATA

The present application claims priority to U.S. Provisional Application Ser. No. 62/705,026, filed Jun. 8, 2020, which application is incorporated by reference in its entirety herein.

FIELD OF THE INVENTION

The present invention relates to methods and devices for dispensing condiments or similar food items, including via connected devices and systems.

BACKGROUND OF THE INVENTION

Food service locations and their patrons are continuously looking for ways to ensure a safe environment for the preparation, delivery and consumption of food. The recent outbreak of illness COVID-19 caused by the SARS-CoV-2 virus has heightened this concern.

As one area of concern, food service locations (restaurants, food trucks, food courts, etc.) often provide condiments that the patrons may use to self-personalize their food. Such condiments may include, but are not limited to salt, pepper, catsup, mustard, relish, hot sauce, soy sauce, sugar, cream, etc. Frequently, food service locations fill containers of condiments and leave them on the food service tables or at other self-service locations, such as an adjacent counter. In this configuration, however, each patron who wishes to add condiments to their food must handle the condiment dispenser(s). This might comprise, for example, picking up and shaking a salt or pepper dispenser, grabbing and squeezing a bottle of catsup, or pressing a dispensing handle or plunger of a dispenser. In each case, the patron then risks contact with an object that may carry a virus, bacteria or other pathogens.

As one attempt at addressing this issue, some food service locations have removed traditional condiment dispensers and have gone to single-serve condiment packages. For example, a food service vendor might remove salt and pepper shakers and catsup and mustard bottles at a table and instead provide a supply of individual salt and pepper packets, or catsup and mustard packets. This solution has a number of drawbacks. For example, the packets are much more expensive to provide and are less user friendly, in that the patron may need to tear open and multiple packets of condiments in order to obtain the desired quality of each condiment. Further there is no assurance from the patron that prior patrons have not come in contact with the packets while they attempted to grab packets for their own consumption.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a contactless dispenser for condiments or similar food service related items, including but not limited to items such as salt, pepper, catsup, mustard, various sauces or other toppings, sugar, cream, etc. By "contactless", it is preferably meant that a patron can obtain a quantity of a condiment without being required to touch the condiment dispenser.

In one embodiment, a patron provides a contactless input in order to cause the dispenser to dispense the condiment. The input preferably comprises a touch-less input to a sensor, such a hand input, recognition of unique spoons placed alongside or adjacent to the dispenser (which may be provided with the patron's table setting that are designated for this contactless dispenser). In other embodiments, the input could be to an object other than the condiment dispenser, such as the patron's mobile communication device.

In general, the touchless input preferably causes means for dispensing to cause a quantity of a condiment to be dispensed from at least one dispenser. The dispenser might comprise a bottle, bin, carton or other type of container.

Figure 1:
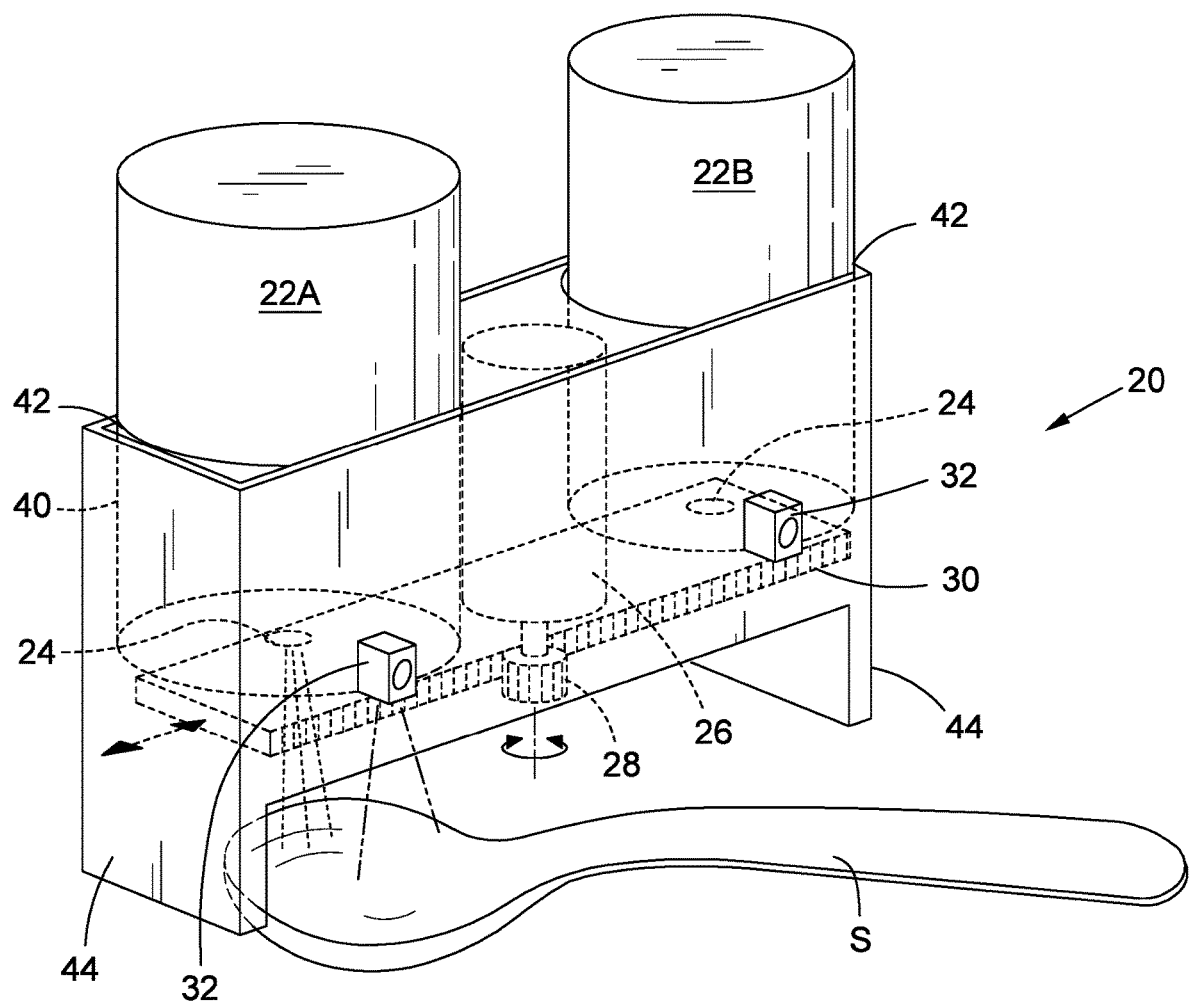
FIG. 1 illustrates one embodiment of a contactless condiment dispenser in accordance with the present invention.

Aspects of the invention will be appreciated from an example embodiment of the invention. FIG. 1 illustrates a contactless condiment dispenser 20 for dispensing salt and pepper. As illustrated, the dispenser includes a container of salt 22A and a container of pepper 22B. Each container may have a dispensing hole or port 24 at a bottom thereof. Preferably, the dispensing holes 24 are selectively openable via touchless input by a user recognized by the dispensing unit.

In one embodiment, means are provided for opening and closing the dispensing ports 24. One example of such a means is illustrated in FIG. 1. As illustrated, the means comprises a motor 26 which controls a toothed slider 30 via a rotating gear 28. When the motor 26 turns the gear 28, the gear moves the slider 30. When the gear 28 is rotated in a first direction, such as clockwise, the slider 30 moves in a first direction, such as to the right in FIG. 1. The movement of the slider to the right may expose the dispensing port 24 of the container of salt 22A, thus allowing salt to be dispensed. In one embodiment, the motor 26 may turn the gear 28 back the other direction in order to close the dispensing port 24 after a designated period of time. In this same vein, if the motor 26 drives the gear 28 counterclockwise, the slider 30 moves to the left, thus exposing the dispensing port 24 of the container of pepper 22B. In other embodiments, as described below, the ports 24 might be maintained in an open position for a period of time until a designated quantity of condiment is dispensed, or until the user input is removed.

In one embodiment, the elements of the dispenser 20 might be associated with a housing 40 or other support or mount. For example, the housing 40 might include apertures 42 at a top thereof for removably accepting the containers 22A,B (the dispenser 20 might be configured to work with one, two or more containers or other condiment holing structures). In such a configuration, the containers 22A,B may be removable, such as to replace or refill them. In other embodiments, the housing 20 might define the containers, such as by defining cavities for accepting condiments therein (e.g. a refillable cavity). In one embodiment, the housing 40 defines an open bottom or one or more openings corresponding to or comprising the ports 24. As indicated, the housing 40 may be supported by one or more legs 44 so that the ports 24 are elevated a sufficient distance for a user to place a spoon S or other element under the port 24 for accepting the dispensed condiment. The housing 40 might also house or support other elements, such as the motor 26, gear 28, slider 30, etc.

In one embodiment, the dispenser 20 may receive information regarding a designated amount of condiment to be dispensed (such as from an application running on a patron's mobile device, as described below), where the port is maintained in an open position until the desired amount designated by the patron is dispensed. In yet another embodiment, the port is maintained open until it detects the proper amount dispensed relative to the utensil the dispenser detected for use (e.g. detected teaspoon vs. tablespoon).

Figure 2:
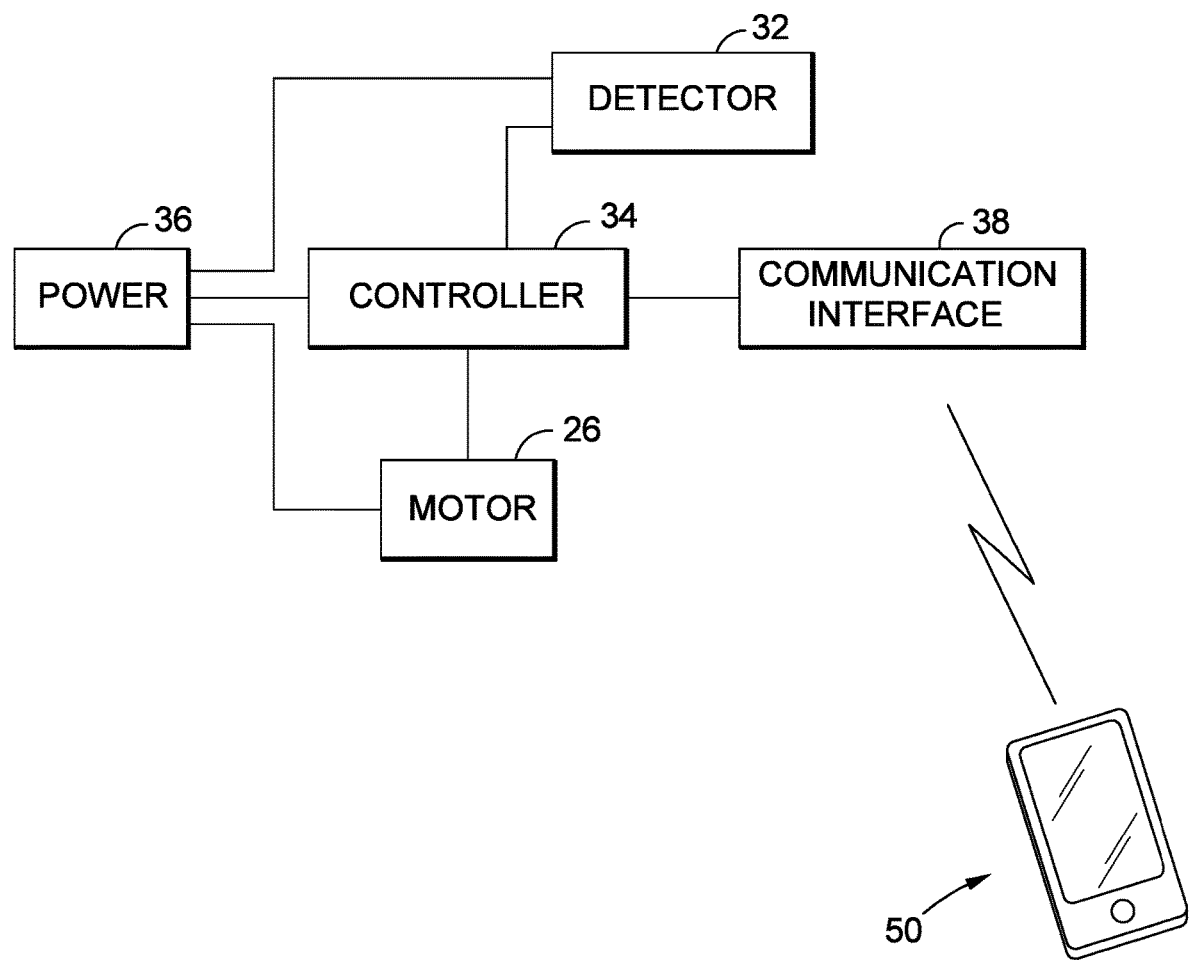
FIG. 2 is a schematic of a control system of the condiment dispenser illustrated in FIG. 1.

Referring to FIGS. 1 and 2, in one embodiment, touchless input means are provided for controlling the means for dispensing, such as the motor 26. The touchless input means may comprise one or more detectors 32 and a controller 34. The detectors 32 might comprise, for example, proximity sensors which detect location of an object in close proximity by changes in reflected light. For example, as illustrated in FIG. 1, when a user places a spoon S under one of the detectors 32 the detector 32 may transmit a signal to the controller 34 which then actuates the motor 26. Preferably, the controller 34 actuates the motor 26 to cause it to open the dispensing port 24 corresponding to where the spoon S is located. Referring again to FIG. 2, in another embodiment, as detailed below, the input might comprise a signal from an application on a user's device 50, such as their mobile phone, such as via a communication interface 38 of the dispensing device 20 (which interface 38 may support, for example, wireless communications). In yet another embodiment, the signal might comprise the detection of a special spoon or other utensil or the like which is located adjacent to the dispenser (for example, by a spoon having an RFID chip or the like which the dispenser can detect, such as via a chip reader).

In one embodiment, the dispensing mechanism is powered, such as by a power source 36. The power source might be a battery or a wired power source (such as AC or DC) or another power source (or be solar powered, etc.). Preferably, the power source is not wired, such as comprising one or more rechargeable batteries, thus permitting the dispenser 20 to be easily moved.

Of course, other means for dispensing may be utilized other than a motor driven slider bar which opens or closes dispensing ports. For example, the means for dispensing might comprise a rotary driven screw that is located in each container, whereby rotation of the screw causes salt or pepper to be delivered to a delivery opening. Further, the means for dispensing might depend upon the nature of the condiment. For example, relative to a fluid, the means for dispensing might comprise a motor-driven pump that sucks catsup or mustard from a container and delivers it through a tube. In another arrangement, the motor might drive a plunger which presses a quantity of condiment from a container through a delivery spout or the like.

As indicated above, the touchless input means may also comprise various devices now known or later developed that are capable of receiving input from a user without the requirement of physical contact. Such might comprise various proximity sensors, such as motion or light detectors, and might even comprise means for receiving voice instructions (such as a microphone connected to a controller which is configured to decipher voice input). As one example, the detector might comprise a light sensing device which measures the distance between the sensor and an object, such as a spoon, such as the VL6180X ambient light sensing proximity sensor produced by STMICRO (www.st.com).

In one embodiment, the means for dispensing might be configured to dispense a pre-designated quantity of condiment or might dispense condiment until an input is removed or a second input is provided. For example, relative to the embodiment illustrated in FIG. 1, so long as the patron leaves their spoon S under one of the detectors 32, the dispenser 20 might dispense condiment. In other situations, the dispenser 20 may automatically close, such as to prevent accidental dispensing of large quantities of condiment.

As indicated, the contactless condiment dispenser might communicate with other devices, such as to receive input therefrom or to provide information thereto. For example, the controller 34 of the dispenser 20 might be configured to communicate with other devices, such as a user's mobile communication device 50, or with a laptop, tablet, desktop computer, or even third party devices and systems, such as the Internet and external servers.

In one embodiment, a user might use their phone 50 to detect the dispenser 20 and might then provide inputs to the dispenser, such as via input to their phone. Such interfacing might be facilitated by a downloadable application on the user's mobile device 50, by scanning a QR code to identify the dispenser 20, etc. (and thus ensure pairing with the desired dispenser and not another dispenser). For example, the application might display a graphically generated "Salt" button and a "Pepper" button, where when the user touches a touch-screen at the location of the displayed "Salt" button, the application may cause the user's mobile phone 50 to send a signal to the controller of the dispenser to control the dispensing means to dispense a quantity of salt.

In one embodiment, as indicated above, such an interface may allow the user to control the amount of condiment to be delivered (such as by weight, volume or other indicator— such as "a little" or "a lot").

In such a configuration, the dispenser 20 might communicate with the user's device 50. As one example, the dispenser 20 might report an amount of condiment that was delivered to the user. This information might be used by the user, or an application (either locally or remote, including a third party application or service), such as which tracks food intake by the user. As one example, the dispenser 20 might report a quantity of salt delivered to the user via an application running on a synced mobile device of the user. The application might track total salt intake for the user and provide information to the user about potential health issues or the like, or such information might be further transmitted to a third party application or service which tracks total daily food intake and uses the information regarding the delivered quantity of salt as part of that analysis. For example, when the dispenser 20 is used in this embodiment, the mobile application can log the type, time, location and amount dispensed by the patron where this data can used for a variety of other uses, such as tracking the patron's consumption of sodium. As one example, if such consumption reaches levels of health risk to the patron, the mobile application can warn the patron upon next use of the dispenser and/or the dispenser can limit the amount dispensed regardless of the desired amount initiated by the patron via their mobile application.

The dispenser 20 and/or user's device 50 might communicate with other systems, such as external health systems and/or restaurant systems. For example, the dispenser 50 might communicate with a restaurant system for use in obtaining particular information about amounts or types of condiment to be dispensed, such as based upon the restaurant's suggestions as to particular foods offered by the restaurant. In one embodiment, a user might utilize their device 50 to input (such as via a touch screen) the items they have ordered at a restaurant and restaurant system might deliver condiment information to the user's device 50 and/or dispenser 20 for controlling the amount and/or type of condiment to be delivered to the user based upon the selected food. In other embodiments, the amount or type of condiment might be controlled by an external health system. For example, relative to a health profile of the user, an external system might control how much condiment (such as salt) a user should use (including, for example, tracking salt intake and then controlling the amount of salt used by the user based upon total salt intake for the day) such as by sending control instructions to the user's device 50 which causes the dispenser 20 to dispense the correct/desired amount.

The contactless condiment dispenser of the invention has numerous advantages. For example, it may be refillable, may be located at a table or other convenient location, and most importantly, can be operated by a user or patron without contacting the dispenser itself.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A system comprising:
a user computing device; and
a touchless condiment dispenser comprising:
   a container for holding a quantity of condiment, said container having at least one dispensing port;
   a condiment dispenser configured to selectively deliver condiment from said container;
   a memory;
   a controller;
   a wireless communication interface; and
   non-transitory machine-readable code stored in said memory and executable by a processor, said processor configured to:
      process a request for condiment received by said wireless communication interface; and
      transmit an instruction to said condiment dispenser to cause said condiment dispenser to operate for a determined, variable time duration to cause an amount of condiment to be dispensed from said container, said amount of condiment varying based upon said time duration;
   wherein said container has at least one dispensing port and said condiment dispenser comprises a port control mechanism configured to move said at least one dispensing port between an open position which allows condiment to be dispensed through said port from said container and a closed position which prevents condiment from being dispensed through said port from said container;
   a downloadable application, said downloadable application comprising machine-readable code storable in a memory of said user computing device and configured to cause said user computing device to:
      cause a display device of said user computing device to display a graphical user interface, to receive an input from a user relative to at least one element displayed by said graphical user interface, to generate said request, and to transmit said request to said touchless condiment dispenser;
   wherein said request includes said time duration;
   wherein said request is received wirelessly from said user computing device.

2. The touchless condiment dispenser of claim 1, wherein said machine-readable code is configured to cause said controller to generate said time duration.

3. The touchless condiment dispenser of claim 1, wherein said request comprises information regarding said time duration.

4. The touchless condiment dispenser of claim 1, wherein said request is received from a wireless communication device of a user.

5. The touchless condiment dispenser of claim 4, wherein said request is generated by an application running on a processor of said wireless communication device and said request is generated in response to an input to a touch-screen of said wireless communication device.

6. The touchless condiment dispenser of claim 1, comprising a first container for containing a first condiment, said first container having a first port, and a second container for containing a second condiment, said second container having a second port, said at least one port control mechanism configured to open and close said first port and open and close said second port.

7. The touchless condiment dispenser of claim 1, wherein said condiment dispenser comprises at least one of: a motor-operated slider, a pump and a rotary delivery device.

8. The touchless condiment dispenser of claim 1, wherein a length of said time duration depends upon at least one of: health information regarding a user, an amount of condiment previously dispensed to said user, and a type of food to which the condiment is to be applied.

9. A system comprising:
a user computing device; and
a touchless condiment dispenser comprising:
   a container for holding a quantity of a condiment;
   a condiment dispenser configured to selectively deliver condiment from said container;
   a memory;
   a controller;
   a touchless detector;
   a wireless communication interface; and
   non-transitory machine-readable code stored in said memory and executable by a processor, said processor configured to:
      receive a dispensing output from said detector based upon detection of a utensil proximate to said dispenser; and
      transmit an instruction to said condiment dispenser to cause said condiment dispenser to operate for a determined, variable time duration to cause an amount of condiment to be dispensed from said container, said amount of condiment varying based upon said time duration;
   wherein said container has at least one dispensing port and said condiment dispenser comprises a port control mechanism configured to move said at least one dispensing port between an open position which allows condiment to be dispensed through said port from said container and a closed position which prevents condiment from being dispensed through said port from said container;
a downloadable application, said downloadable application comprising machine-readable code storable in a memory of said user computing device and configured to cause said user computing device to:
  cause a display device of said user computing device to display a graphical user interface, to receive an input from a user relative to at least one element displayed by said graphical user interface, to generate said request, and to transmit said request to said touchless condiment dispenser;
wherein said request includes said time duration;
wherein said request is received wirelessly from said user computing device.

10. The touchless condiment dispenser of claim 9, wherein said touchless detector comprises a proximity detector.

11. The touchless condiment dispenser of claim 9, wherein said touchless detector comprises an RFID detector.

12. The touchless condiment dispenser of claim 11, wherein said RFID detector is configured to detect an RFID tag associated with said utensil.

13. The touchless condiment dispenser of claim 12, wherein said time duration is dependent upon said RFID tag.

14. The touchless condiment dispenser of claim 9, wherein said container has a dispensing port located at a bottom of said container and said detector is configured to detect a utensil located under said port.

15. The touchless condiment dispenser of claim 9, wherein said condiment dispenser comprises at least one of a rotary delivery device and a pump.

\* \* \* \* \*